United States Patent [19]
Matteson

[11] Patent Number: 5,676,862
[45] Date of Patent: Oct. 14, 1997

[54] ELECTRIC RESISTANCE WELDER HAVING CAPABILITY OF CONSISTENT SEAM WELDING AND HEAT-TREATING

[75] Inventor: Robert P. Matteson, Warren, Ohio

[73] Assignee: Taylor Winfield Corporation, Brookfield, Ohio

[21] Appl. No.: 721,898

[22] Filed: Sep. 27, 1996

Related U.S. Application Data

[63] Continuation-in-part of Ser. No. 206,665, Mar. 7, 1994, abandoned.

[51] Int. Cl.$^6$ ................................................. B23K 11/06
[52] U.S. Cl. ........................... 219/110; 219/81; 219/83; 219/117.1
[58] Field of Search .............................. 219/81, 82, 83, 219/108, 110, 117.1

[56] References Cited

U.S. PATENT DOCUMENTS

| | | |
|---|---|---|
| 1,664,030 | 3/1928 | Gravell. |
| 3,026,404 | 3/1962 | Harris. |
| 3,095,500 | 6/1963 | Jost. |
| 3,909,578 | 9/1975 | Williams et al.. |
| 4,634,830 | 1/1987 | Furudate ................................. 219/110 |

FOREIGN PATENT DOCUMENTS

| | | |
|---|---|---|
| 54-99050 | 8/1979 | Japan. |
| 1372616 | 10/1974 | United Kingdom. |

*Primary Examiner*—Clifford C. Shaw
*Attorney, Agent, or Firm*—Fay, Sharpe, Beall, Fagan, Minnich & McKee

[57] ABSTRACT

An electric resistance welder welds, hot reduces, tempers and planishes overlapped metal workpieces. The welder incorporates two transformers (50, 60) which are connected to two sets of wheel electrodes (26, 28 and 36, 38). Electric current from a first transformer (50) flows through workpieces (16) and returns through a second transformer (60). The first set of wheel electrodes (26, 28) creates a weld joint and the second set (36, 38), depending on the shape, area, and pressure of the wheels, either reduces the weld thickness, tempers the weld joint, or both. A control circuit (72) includes a current sensor (70) and power factor adjuster (80). The current sensor senses current flow through the first transformer during the welding process. As the current changes, particularly when the sets of wheel electrodes engage and disengage the workpieces, the power factor adjuster (72) adjusts the power factor to maintain constant heat to the workpieces. The electric resistance welder produces continuous, even tempered seam welds having reduced thickness.

20 Claims, 4 Drawing Sheets

ELECTRIC RESISTANCE WELDER HAVING CAPABILITY OF CONSISTENT SEAM WELDING AND HEAT-TREATING

This application is a continuation-in-part of application Ser. No. 08/206,665, filed Mar. 7, 1994, now abandoned.

BACKGROUND OF THE INVENTION

The present invention relates to the art of electric resistance welding and more particularly to seam welding. The invention is particularly applicable to electric resistance welders having rotating wheel or roller electrodes to weld metal sheet or strip in edge-to-edge or end-to-end relation and will be described with particular reference thereto. However, it will be appreciated that the invention has broader applications such as roll-spot welding and may be advantageously employed in other environments and applications.

Generally, seam welders use a pair of weld wheels to both apply pressure and pass current through the weld joint. The current and the pressure are selected based on the thickness, conductivity and other properties of the material being welded. Stronger metals and alloys require higher electrode pressures. To create the same amount of heat, poor electrical conductors require less current than good electrical conductors. For example, copper, silver, and gold, which are excellent electrical conductors, require high current densities to compensate for their low resistance.

When seam welding the ends of steel sheets or strips together, the welding process is often followed with a planishing process to reduce the weld thickness to an acceptable level. In U.S. Pat. No. 3,909,578 to Williams, et al., a conventional seam welder employs a set of weld wheels followed by a planish roll.

Generally, a single welding current power transformer supplies the welding current through buss bars that span the clamps that secure the strip ends. The force of the planish system is usually twice the force of the welding system. While this conventional seam welding process has had some commercial success, it still produces a weld joint thickness that is significantly greater than the parent metal thickness. Further, the planish process produces stresses in the weld region which are objectionable in high carbon and hardenable materials.

The machines using the conventional weld-planish process have evolved over many decades and now include a number of additional functions such as loading, aligning, shearing, and overlapping the strip before it is welded and planished. However, many of these machines do not include the function of tempering. Medium- and high-carbon steels, which are hardened and embrittled during the normal welding process, must be tempered to regain some of the original properties of the metal. See, for example, U.S. Pat. No. 1,664,030 to Gravell which discloses a method and apparatus for electric resistance seam welding with three sets of weld wheels, but with no tempering. See also, British Patent No. 1,372,616, in which a seam welding machine uses two pairs of wheel electrodes to simultaneously produce two parallel welds, but with no tempering.

In Japanese Patent No. 54/099,050, two pairs of longitudinally spaced rollers achieve high speed seam welding by preheating material with the first set of wheels and welding with the second set of wheels. No tempering is performed. Further, the patent applies to tube mills where the start and finish portions of the weld are not used.

The present invention contemplates a new and improved apparatus and method which overcomes the above-referenced problems and others and provides flat, seamless, tempered welds in simple and economical fashion.

SUMMARY OF THE INVENTION

In accordance with the present invention, there is provided an electric resistance welder for joining metal workpieces in edge-to-edge relationship to each other. The welder comprises a frame through which metal workpieces pass and a pair of opposed weld wheel electrodes for welding the workpieces. The pair of opposed weld wheel electrodes has an upper weld wheel and a lower weld wheel. The pair of wheel electrodes are mounted to the frame. Further, the welder comprises a pair of opposed hot wheel electrodes for treating the workpieces. The pair of opposed hot wheel electrodes has an upper hot wheel and a lower hot wheel. The pair of hot wheel electrodes are mounted to said frame behind and in line with the pair of weld wheel electrodes.

In accordance with a more limited aspect of the invention, the welder further comprises a first power supply electrically connected to the upper weld wheel and the upper hot wheel. The first power supply supplies current to the upper weld wheel and the upper hot wheel. The welder further comprises a second power supply electrically connected to the lower weld wheel and the lower hot wheel. The second power supply supplies current to the lower weld wheel and the lower hot wheel.

Further, in accordance with the invention, the electric resistance welder comprises a sensor for sensing engagement of the workpieces by at least one of said pair of weld wheel electrodes and said pair of hot wheel electrodes.

A principal advantage of the invention is the provision of seamless welds with reduced weld thickness.

Another advantage resides in welding from edge-to-edge.

Another advantage is that the weld thickness is hot reduced.

Another advantage of the invention is the tempering of the weld joint.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
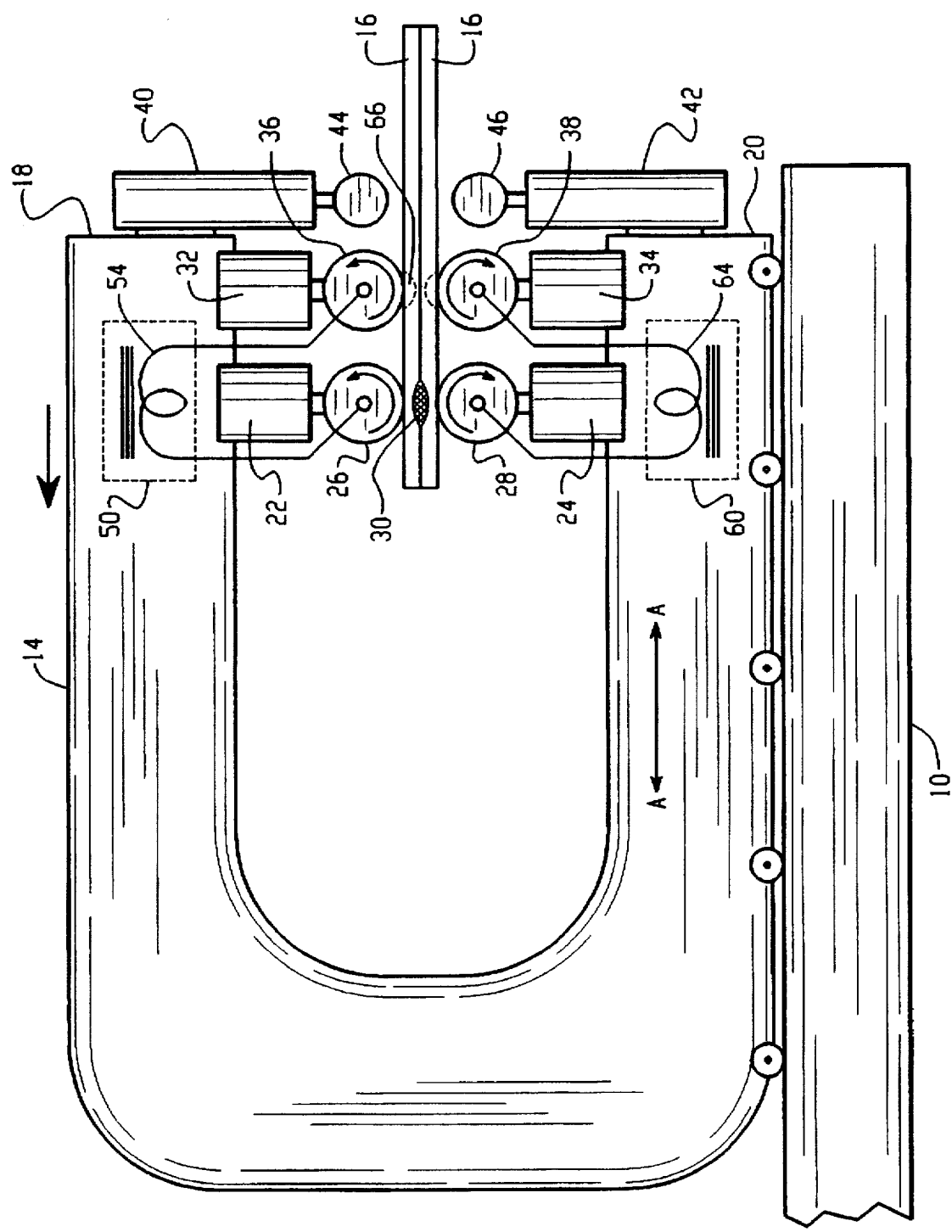
FIG. 1 illustrates a side view of the electric resistance welder of the present invention.

With reference to FIG. 1, a base 10 movably supports a carriage or C-frame 14. The C-frame moves back and forth in the direction A—A to process overlapped metal sheet or workpieces 16. That is, the frame moves parallel to a weld direction and transversely to a workpiece feed direction. In additional embodiments, other frames may be used such as O-frames or other types of frames through which the workpieces can pass.

The C-frame 14 has arms 18, 20 supporting first upper and lower pressure cylinders 22 and 24 which, in turn, support upper and lower weld wheel electrodes 26 and 28. The weld wheels apply pressure and electric current to the workpieces to create a weld seam or joint 30 between and trailing behind the weld wheel electrodes.

The arms 18, 20 also support second upper and lower pressure cylinders 32 and 34 to which upper and lower second wheel electrodes 36 and 38 are attached. The second wheel electrodes heat treat the weld joint also by applying pressure and current. Heat treatments include hot reducing the joint and/or tempering it. That is, the second pair of wheel electrodes introduce additional current (energy) into the still warm weld. The amount of additional heating or energy is controlled by a combination of current and pressure and wheel shape.

The arms further support third upper and lower pressure cylinders 40 and 42. Third pressure cylinders operate planish rollers 44 and 46 which cold reduce the weld joint and improve the surface appearance of the finished product. It will be appreciated that each pair of pressure cylinders can be replaced with one pressure cylinder to exert compressive forces on the workpieces. Further, other types of pressure systems may be used in place of the pressure cylinders.

Figure 2:
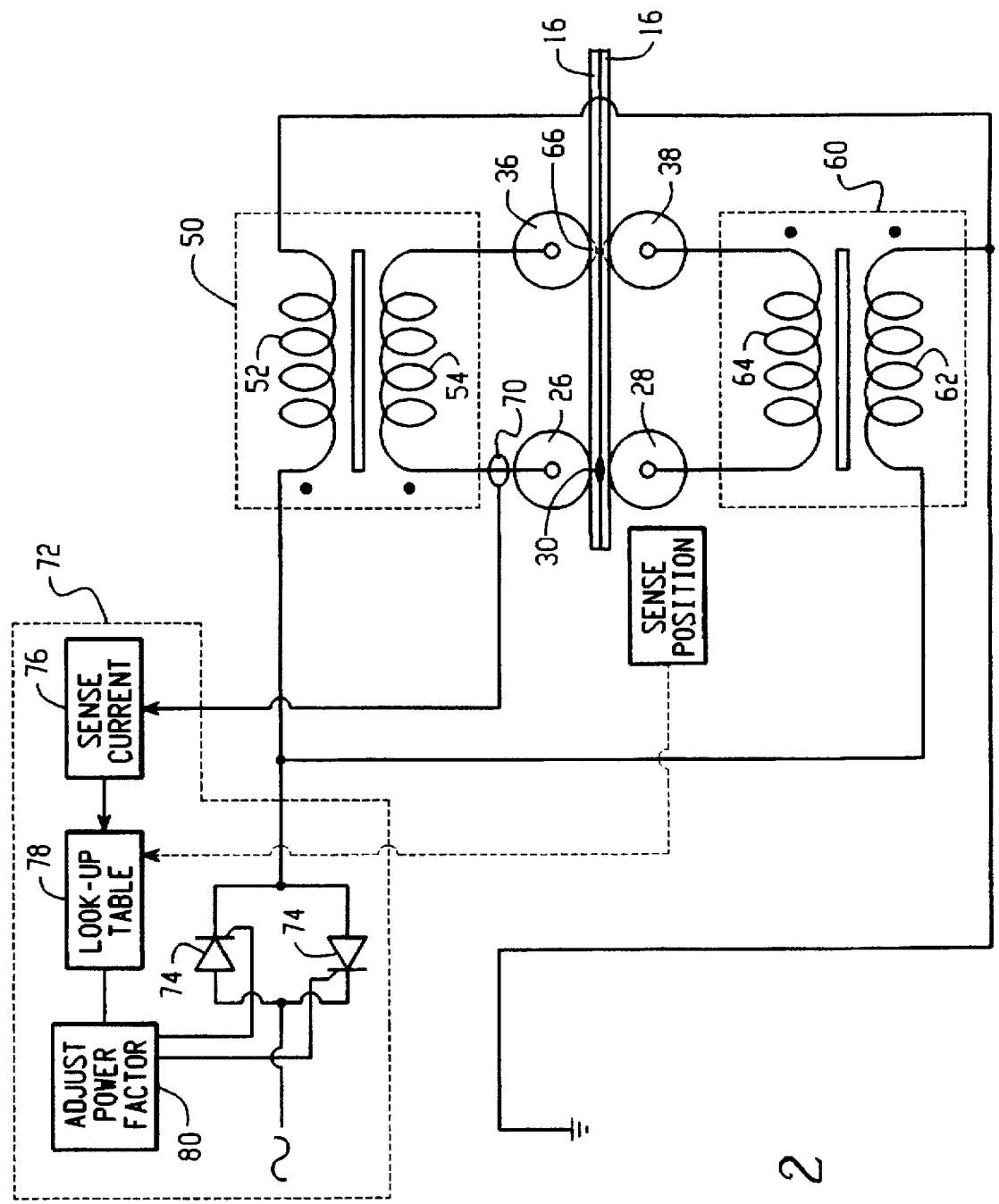
FIG. 2 illustrates a schematic of the electrical circuit of the present invention; and, FIG. 3A is a diagrammatic illustration of the electrode wheels before workpieces are engaged.

With continuing reference to FIG. 1 and further reference to FIG. 2, a first alternating current power supply or transformer 50 has a primary winding 52 and a secondary winding 54. The secondary winding 54 of the first transformer has terminals electrically connected across the upper weld wheel electrode 22 and the upper second wheel 36, respectively. A second alternating current power supply or transformer 60 has a primary winding 62 and a secondary winding 64 electrically connected across the lower weld wheel electrode 28 and the lower second wheel electrode 38. The power supplies 50, 60 can be either transformers, inverters, DC supplies, or the like. The power supplies are connected so that their instantaneous voltages produce current flow through the materials being welded. When workpieces are engaged by the weld and second wheel electrodes, alternating current flows at one instant from secondary winding 54 of first transformer through the upper weld wheel electrode 26, the upper workpiece, the weld joint 30, the lower workpiece, the lower weld wheel 28, secondary winding 64 of second transformer, the lower second wheel electrode 38, a heat treatment region 66 of the workpieces, the upper second wheel electrode 36, and back into secondary winding 54 of the first transformer, successively. The shape, area, applied pressure, and the like of the second wheel electrodes controls reduction of the weld thickness, tempering the weld joint in the heat treatment region 64, or both.

More specifically, as the weld wheel electrodes bear down on the overlapped workpieces, the pressure affects electrical resistance and current flow. The electrical resistance and current generate heat for welding. The overlapped edges of the workpieces are mashed down, heated, fused, and seamlessly welded together. Residual heat remains in the weld region after welding as the second wheel electrode bear down on the weld joint. The force of the second pair of electrodes and the completed weld are selected to reduce electrical resistance, hence lesser heating. An appropriate electrical resistance and lesser heating may also be achieved by careful determination of the size of the second wheel electrodes and the electromechanical properties thereof. The current flow and electric resistance between the second wheel electrodes generate heat to perform a heat treating process such as hot planishing, hot reducing, tempering, or the like. Hot planishing reduces the weld thickness with less force and produces less residual stress in the weld joint than cold planishing. The residual heat also provides a temper heat which is advantageous when welding hardenable materials and high carbon materials.

Finally, the weld joint passes to the planish wheels where it is cold planished, when desired, to further reduce the weld joint or to improve the appearance of the finish on the workpieces. It will be appreciated that the operation of cold planishing may be removed from the preferred embodiment of the present invention if the desired properties of the workpieces are achieved through the welding and hot reducing/tempering operations. It should be noted that the electric resistance welding machine of the present invention may incorporate other operations such as clamping the workpieces together, shearing the edges of the workpieces parallel, correcting for misalignment, and overlapping the edges of the workpieces a predetermined amount.

With particular reference to FIG. 2, as workpieces are successively engaged by weld wheel electrodes and the second wheel electrodes, a current feedback coil or sensor 70 monitors current flow through the closed loop, preferably at the secondary winding 54 of the first transformer. It is to be appreciated that at the start of the welding process, only the weld wheel electrodes contact the metal workpieces. When the carriage or frame travels further across the workpieces, both pairs of wheel electrodes contact the workpieces. At the other extreme of carriage movement, only the second pair of wheel electrodes engage the workpieces. This changes the system electrical impedance and current flow as described more fully below.

For a consistent weld, the power delivered by the electrical current is held constant as the impedance and current change. As the current changes, a control circuit 72 compensates for this change by adjusting the characteristics of the alternating current, particularly the power factor, to hold the energy delivered to the weld constant. The changes in sensed current are attributable to the weld electrodes or to the second electrodes contacting the workpieces, as well as to resistance changes as the weld progresses.

To adjust the characteristics of the alternating current and, accordingly, to maintain constant current through the workpieces, the control circuit 72 includes a pair of silicon-controlled rectifiers (SCRs) 74 wired in reverse parallel. Adjusting the bias on the SCRs adjusts the portion of each AC cycle that is delivered to the workpieces and the portion which is clipped. A sensor circuit 76 reads the output of the current sensor 70 and converts the output to a digital value that is the input to a look-up table 78. The look-up table is preprogrammed with precalculated SCR bias values or power factors for each of a plurality of weld currents. A power factor adjusting circuit 80 receives the readouts from the look-up table 78 and applies the corresponding biases to the SCRs. In this manner, the control circuit 72 adjusts the characteristics of the alternating current delivered to transformers 50, 60 to control the power supplied to the weld joint 30 and heat treatment area 62. In another embodiment, the control circuit 72 calculates the appropriate phase-firing points of the SCRs using a computer algorithm. It will be appreciated that other means exist for maintaining constant welding and hot-reducing/tempering power through the workpieces as they pass through the weld and second wheels. It is intended to encompass these other means within the scope of the invention.

Further, it will be appreciated that other current sensors as well as other types of sensors may be used to determine engagement of the workpieces by the weld and hot wheels. For example, mechanical or positional sensors using levers, electric eyes, capacitance detectors, or the like may be used to determine engagement and signal the control circuit 72 to alter the power factor. Further, the control circuit may adjust the power factor based on known times that the wheels engage and disengage the workpieces. Still further, engagement of the wheel electrodes with the workpieces may be sensed using transducers associated with the wheel electrodes, or with the pressure cylinders or biasing devices. Representing such alternative sensors and others, a positional sensor 82 is shown with dashed lines in FIG. 2.

Figure 3B:
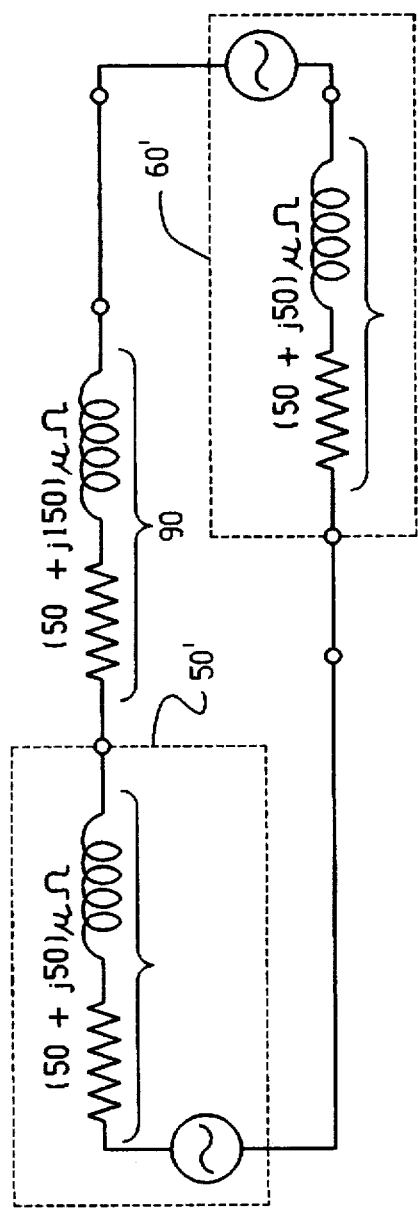
FIG. 3B is an equivalent circuit to the diagram of FIG. 3A.
Figure 3A:
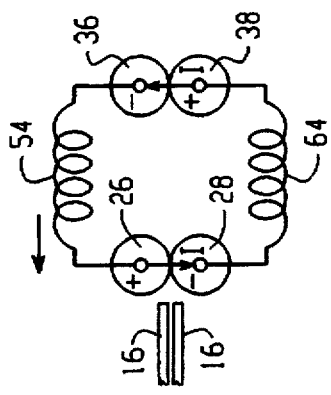

Referring in particular to FIG. 3A, before the start of the welding process, each pair of wheel electrodes 26, 28 and 36, 38 is in contact with each other with no weld material between each pair. In one phase, alternating current flows from upper to lower weld wheel, as shown by arrow and then from lower second wheel to upper second wheel similarly shown. FIG. 3B shows a schematic of the equivalent electrical circuit of FIG. 3A. The impedance and generated voltage of first and second transformers 50 and 60 are represented by schematic sections 50' and 60', respectively. The impedance of the weld wheel electrodes 26, 28 and the impedance of the second wheel electrodes 36, 38 (including the bearings, etc.) is shown by schematic section 90.

When no workpiece is between any of the wheel electrodes, the circuit has relatively low resistance. Consequently, the current through the weld wheel electrodes is relatively high, e.g., 41,200 A. The sensor circuit 76 senses this current and addresses the look-up table 78. The power factor adjusting circuit 80 receives the corresponding relatively low power factor, e.g., 0.5, and adjusts the bias on the SCRs 74 to achieve this power factor and regulates the current to a constant 25,000 A.

Figure 4B:
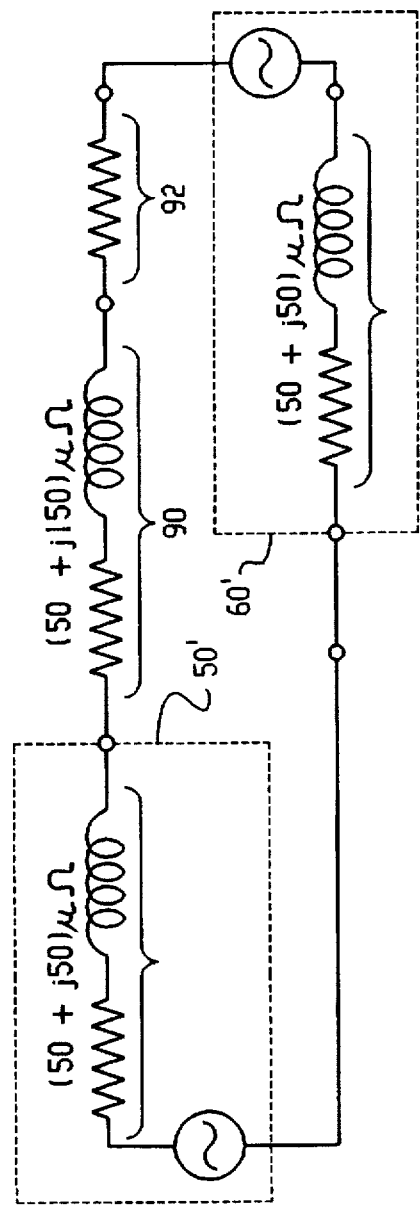
FIG. 4B is an equivalent circuit to the diagram of FIG. 4A.
Figure 4A:
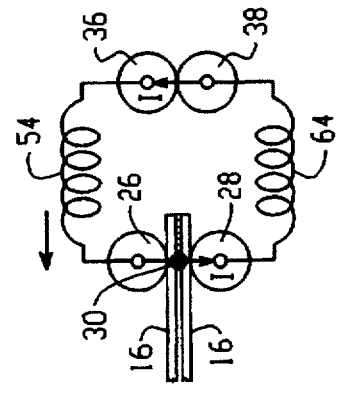
FIG. 4A is a diagrammatic illustration of the weld wheel electrodes engaging a leading edge of the workpieces before the second wheel electrodes have engaged them.

With reference to FIGS. 4A and 4B, as the frame travels forward (left in FIG. 4A), the weld wheel electrodes engage the workpieces. Due to the presence of the workpieces, a weld resistance 92 is added to the equivalent circuit. This increase in resistance and impedance reduces the current, e.g., to 33,900 A. The sensor control 76 responds to the sensing of about 33,900 A by accessing the look-up table 78 to select a higher power factor, e.g., 0.7. The power factor adjusting circuit 80 applies the appropriate bias to the SCRs 74 to achieve a power factor of 0.7 and again regulates the weld current to a constant value of 25,000 A.

Figure 5B:
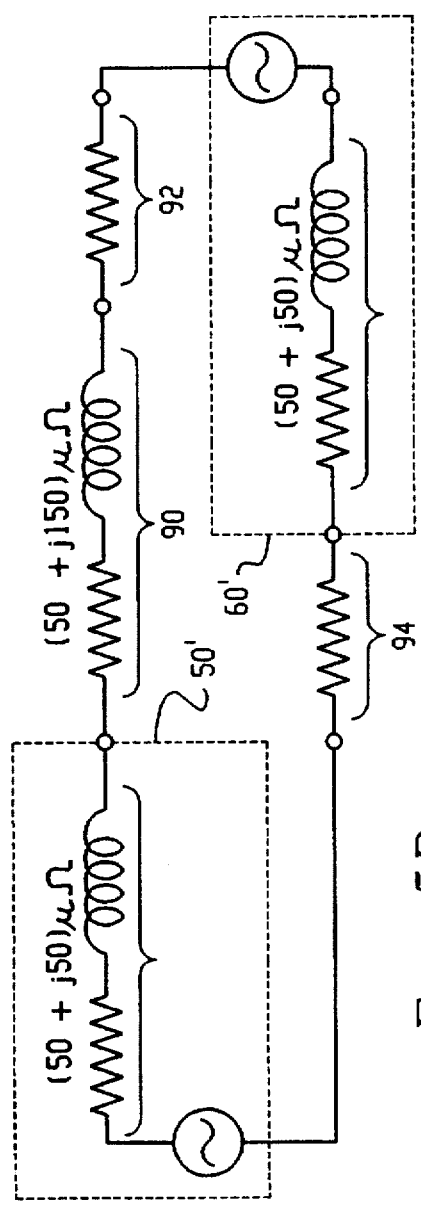
FIG. 5B is an equivalent circuit to the diagram of FIG. 5A.
Figure 5A:
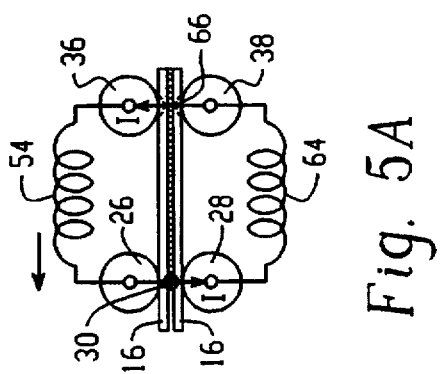
FIG. 5A is a diagrammatic illustration of workpieces engaged by both the weld and second wheel electrodes.

With reference to FIGS. 5A and 5B, with further travel, both the weld wheel electrodes 26, 28 and the second wheel electrodes 36, 38 engage the workpieces, i.e., the equivalent circuit includes heat-treat resistance 94 between the second wheel electrodes in addition to the weld resistance 92 between the weld electrodes. This added resistance results in a current drop, e.g., to about 28,000 A. The sensor control circuit 76 addresses the look-up table 78 with this lower amperage to retrieve a higher preprogrammed power factor, e.g., a power factor of 0.8. The power factor adjusting circuit 80 controls the SCRs 74 to apply this higher power factor and again regulates the weld current to a constant value of 25,000 A.

Figure 6B:
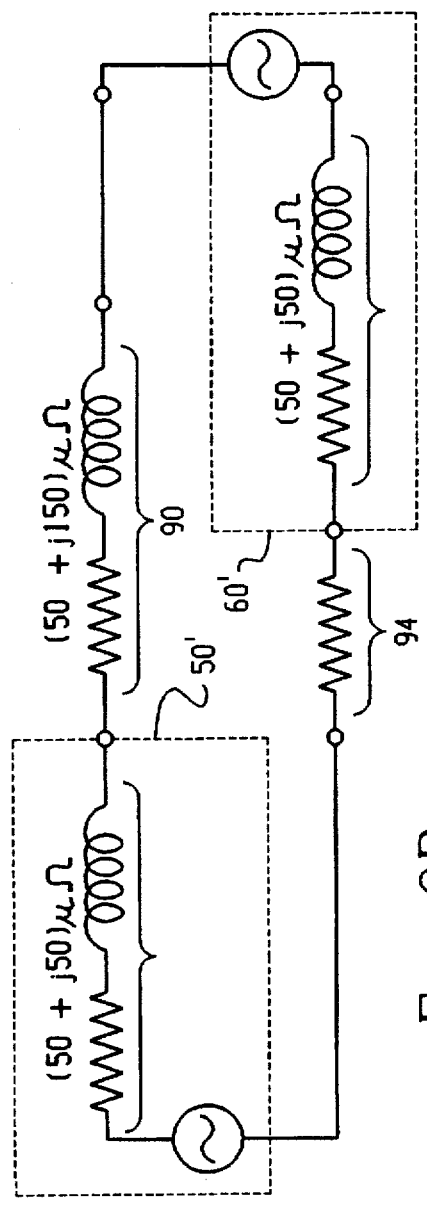
FIG. 6A is a diagrammatic illustration at the second edge of the workpieces after the weld wheel electrodes have moved off them and the second wheel electrodes are still engaging them; and, FIG. 6B is an equivalent circuit to the diagram of FIG. 6A.
Figure 6A:
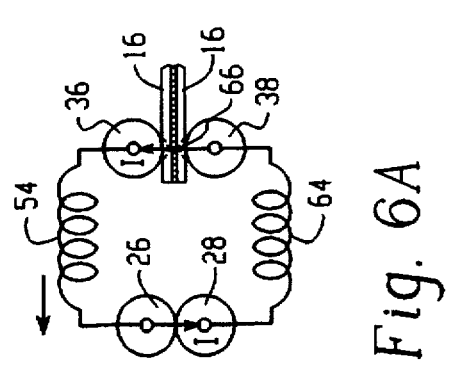

With reference to FIGS. 6A and 6B, as the frame moves such that the weld wheel electrodes move off the workpieces, the weld resistance 92 is deleted from the equivalent circuit reducing impedance and raising the inherent current flow, e.g., to about 41,200 A. Using the value of 41,200 A, the sensor circuit 76 addresses a look-up table and the power factor adjusting circuit 80 adjusts the bias to the SCRs to achieve a power factor of about 0.5 and regulates the current again to a constant value of 25,000 A.

The invention has been described with reference to the preferred embodiments. Obviously, modifications and alterations will occur to others upon reading and understanding the preceding detailed description of the preferred embodiment. It is intended that the invention be construed as including all such alterations and modifications insofar as they come within the scope of the appended claims or the equivalents thereof.

Having thus described the preferred embodiment, the invention is now claimed to be:

1. An electric resistance welder for welding overlapped workpieces to each other, the electric resistance welder comprising:

a first pair of opposed wheel electrodes;

a biasing system for urging the first pair of wheel electrodes resiliently toward each other such that the first pair of wheel electrodes engage each other in an absence of workpieces and engage opposite sides of overlapped workpieces during a weld operation;

a second pair of wheel electrodes;

a second biasing system for biasing the second wheel electrodes toward each other such that the second wheel electrodes engage opposite sides of overlapped workpieces and in the absence of workpieces engage each other;

a first power supply electrically connected between two wheel electrodes of the first and second pair of wheel electrodes;

a second power supply electrically connected between the other two wheel electrodes of the first and second pair of wheel electrodes, such that a welding current flows between the first pair of wheel electrodes and a heat-treating current flows between the second pair of wheel electrodes;

the first and second pairs of electrodes being disposed in alignment with each other such that as the first and second pairs of electrodes and the workpieces move relative to each other, the first pair of wheel electrodes weld the workpieces together and the second pair of wheel electrodes cause additional heating of the weld.

2. The electric resistance welder according to claim 1 wherein:

the first power supply is electrically connected between one of the first pair of wheel electrodes and one of the second pair of wheel electrodes; and the second power supply is electrically connected between the other of the first pair of wheel electrodes and the other of the second pair of wheel electrodes, such that a current loop is defined through the first and second pairs of wheel electrodes and the first and second power supplies.

3. The electric resistance welder according to claim 1 further including:

a sensor for sensing engagement of the workpieces by said first pair of wheel electrodes.

4. The electric resistance welder according to claim 3 further including a circuit for adjusting a power factor of the current supplied by the first and second power supplies, the power factor adjusting circuit increasing the power factor in response to the sensor sensing engagement of the workpieces by the first pair of wheel electrodes.

5. The electric resistance welder according to claim 4 wherein the sensor includes a current sensor which senses current flowing through one of the power supplies.

6. The electric resistance welder according to claim 5 further including a look-up table which is addressed with the sensed current to retrieve a corresponding power factor, the power factor adjusting circuit adjusting the power factor of the power supplies to the retrieved power factor.

7. The electric resistance welder according to claim 6 further including a pair of silicon-controlled rectifiers connected in reverse parallel with each other and in series with the first and second power supplies, the power factor adjusting circuit selectively adjusting a bias on the silicon-controlled rectifiers in accordance with the retrieved power factor.

8. The electric resistance welder according to claim 1 further comprising:

a pair of opposed planishing wheels to cold planish the workpieces, said pair of planishing wheels mounted in alignment with the first and second pairs of wheel electrodes.

9. A method of welding and heat-treating overlapped metal workpieces to each other, the method comprising:

(a) contacting a region of the overlapped workpieces with a first pair of opposed wheel electrodes;

(b) passing current between the first pair of wheel electrodes and through the region of the overlapped metal workpieces to weld them to each other;

(c) contacting a second pair of opposed wheel electrodes with the region of overlapped workpieces;

(d) passing current between the second pair of opposed wheel electrodes and through the region of the overlapped workpieces to heat treat the region.

10. The method of claim 9 further comprising:

supplying current to two wheel electrodes of the first and second pair of wheel electrodes from a first source of current; and, supplying current to the other two wheel electrodes of the first and second pair of wheel electrodes from a second source of current such that a welding current flows between the first pair of wheel electrodes and a heat-treating current flows between the second pair of wheel electrodes.

11. The method according to claim 10 further comprising:

applying opposing forces to the first pair of opposed wheel electrodes such that the first pair of wheel electrodes engage each other in an absence of workpieces and engage opposite sides of overlapped workpieces in the presence of workpieces; and applying opposing forces on the second pair of opposed wheel electrodes such that the second pair of wheel electrodes engage each other in an absence of workpieces and engage opposite sides of overlapped workpieces in the presence of workpieces.

12. The method according to claim 11 further comprising:

sensing engagement of the workpieces by at least one of said pair of weld wheel electrodes and said pair of hot wheel electrodes.

13. The method according to claim 12 further comprising:

adjusting a power factor of at least one of the first and second power supplies such that the welding current deposes a generally constant value of power to the region of overlapped metal workpieces.

14. The method according to claim 12 further comprising:

in response to the step of sensing engagement, adjusting a power factor of at least one of the first and second power supplies such that the welding current deposes a generally constant value of power to the region of overlapped metal workpieces.

15. The method according to claim 14 wherein the step of sensing engagement includes sensing current changes in one of the power supplies.

16. The method according to claim 14 wherein step of sensing engagement includes sensing the position of the metal workpieces relative to the first and second pairs of weld wheel electrodes.

17. The method according to claim 14 wherein the step of sensing engagement includes sensing a change in a least one of the welding current and the heat-treating current as at least one of the pair of first wheel electrodes and the pair of second wheel electrodes engage the metal workpieces.

18. The method according to claim 14 wherein the adjustment step includes adjusting a phase firing point of a pair of silicon controlled rectifiers, the rectifiers connected in reverse parallel with each other and in series with the first and second power supplies.

19. The method according to claim 12 further comprising:

in response to the sensing engagement step, adjusting the characteristics of the current to one of the first pair of wheel electrodes and the second pair of wheel electrodes.

20. An electric resistance welder for joining overlapped metal workpieces which produces a uniform, edge-to-edge weld joint and which tempers the weld joint, the welder comprising:

two power supplies;

a first pair of opposed wheel electrodes for welding the workpieces together, thereby creating a weld joint, the first pair of wheel electrodes connected to the power supplies to carry a weld current;

a second pair of opposed wheel electrodes for heat-treating the weld joint, the second pair of wheel electrodes connected to the power supplies to carry a heat-treating current; and a weld control circuit that includes a pair of silicon-controlled rectifiers for controlling the power supplies, the weld control further including a sensor for sensing power factor changes in the weld and heat-treating currents as the wheel electrodes encounter the workpieces, the weld control further including a power factor adjuster that, in response to the sensor, adjusts the phase firing point of the silicon-controlled rectifiers to maintain constant characteristics of the weld and heat-treating currents.

\* \* \* \* \*